(12) United States Patent
Rajkotia et al.

(10) Patent No.: US 9,178,714 B2
(45) Date of Patent: Nov. 3, 2015

(54) SELECTING A COMMUNICATION MEDIUM FOR DATA TRANSMISSION

(71) Applicant: QUALCOMM Incorporated, San Diego, CA (US)

(72) Inventors: Purva R. Rajkotia, Orlando, FL (US); Manjunath Anandarama Krishnam, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 171 days.

(21) Appl. No.: 14/018,241

(22) Filed: Sep. 4, 2013

(65) Prior Publication Data

US 2015/0063134 A1    Mar. 5, 2015

(51) Int. Cl.
    *H04J 1/16*      (2006.01)
    *H04J 3/16*      (2006.01)
    *H04L 12/413*    (2006.01)
    *H04L 12/407*    (2006.01)

(52) U.S. Cl.
    CPC ............ *H04L 12/413* (2013.01); *H04L 12/407* (2013.01)

(58) Field of Classification Search
    CPC ..................... H04L 45/302; H04B 2001/1045; H04B 1/10; H04B 1/1027
    See application file for complete search history.

(56) References Cited

U.S. PATENT DOCUMENTS

| | | | |
|---|---|---|---|
| 6,782,429 B1 | 8/2004 | Kisor | |
| 7,373,112 B2 | 5/2008 | Stephens et al. | |
| 7,394,815 B1 * | 7/2008 | Suzuki | 370/395.41 |
| 7,639,663 B1 * | 12/2009 | Nerses et al. | 370/347 |
| 7,920,586 B2 | 4/2011 | Alapuranen et al. | |
| 8,315,212 B2 | 11/2012 | Karaoguz et al. | |
| 2003/0153294 A1 * | 8/2003 | Hata | 455/302 |
| 2004/0054798 A1 * | 3/2004 | Frank et al. | 709/229 |
| 2004/0062273 A1 * | 4/2004 | Frank et al. | 370/468 |
| 2004/0208139 A1 * | 10/2004 | Iwamura | 370/321 |
| 2004/0259589 A1 * | 12/2004 | Bahl et al. | 455/553.1 |
| 2008/0002716 A1 * | 1/2008 | Wiley et al. | 370/395.21 |
| 2013/0128738 A1 * | 5/2013 | Cohen et al. | 370/235 |
| 2014/0204775 A1 * | 7/2014 | Huang et al. | 370/252 |

* cited by examiner

*Primary Examiner* — Melanie Jagannathan
(74) *Attorney, Agent, or Firm* — Mahamedi Paradice LLP

(57) ABSTRACT

A method for transmitting data from within a wired communication system is disclosed. A first network-enabled device can select one of a plurality of communication mediums for transmitting the data stream to the second device and transmit the data stream to the second device using the selected communication medium. The first device determines that the transmission of the data stream using the selected communication medium is being interfered with by transmission of other data from the first device to a third device on another of the plurality of communication mediums. In response to determining that the transmission of the data stream to the second device on the selected communication medium is being interfered with by the transmission of the other data to the third device using the other communication medium, the first device turns off the transmission of the other data to the third device on the other communication medium.

24 Claims, 3 Drawing Sheets

US 9,178,714 B2

SELECTING A COMMUNICATION MEDIUM FOR DATA TRANSMISSION

TECHNICAL FIELD

The present embodiments relate generally to networking technologies, and specifically to selecting a communication medium for data transmission.

BACKGROUND OF RELATED ART

In a home network, a variety of different networking technologies may be utilized by consumer devices. Both wired and wireless networking technologies are currently used by end users for network connectivity. Because no single networking technology may be suitable for all applications and/or devices, the IEEE developed the IEEE 1905.1 standard for home networking.

The IEEE 1905.1 standard supports both wireless and wired technologies—including wireless fidelity (Wi-Fi), Ethernet, powerline communication (PLC), and Multimedia over Coax (MoCA)—in order to provide a more complete home networking coverage. However, the IEEE 1905.1 standard may not necessarily satisfy the needs of consumers in certain markets (for example, markets where co-axial cables are dominant), and does not currently include other home networking technologies, such as Data over Cable Service Interface Specification (DOCSIS) and Ethernet Passive Optical Network Protocol over Coax (EPoC).

SUMMARY

An issue that may arise with devices supporting DOCSIS and EPoC in home networking is that the frequency range of operation of DOCSIS or EPoC may interfere or overlap with one or more frequency ranges of operation of the technologies supported by the IEEE 1905.1 standard. For example, if an upstream DOCSIS communication occurs in a first frequency range of between 5 MHz and 85 MHz and a PLC communication occurs in a second frequency range of between 1.8 MHz and 50 MHz, then the transmission of the DOCSIS communication may interfere with the transmission of the PLC communication. It is desirable to minimize this interference.

A device and method are disclosed that mitigate the problems that arise due to overlapping or interfering frequency ranges of different networking technologies when transmitting data. In some embodiments, a first device may determine that a data stream is to be transmitted to a second device, such as a consumer device. The first device and the second device may communicate with each other using a variety of different networking technologies that utilize different communication mediums. Depending on implementation, the first and second devices may communicate with each other within a wired communication system, a wireless communication system, or a wired and wireless communication system. The first device may select one of the plurality of communication mediums for data transmission, and transmit the data stream to the second device using the selected communication medium. According to some embodiments, the plurality of communication mediums may include an Ethernet transmission line, a co-axial cable, a power line, and a wireless medium.

For at least one embodiment, during transmission of the data stream to the second device, the first device determines whether the transmission of the data stream using the selected communication medium is being interfered with by transmission of other data from the first device to a third device on another communication medium. If the transmission of the data stream to the second device using the selected communication medium is being interfered with by the transmission of the other data to the third device on the other communication medium, then the first device turns off the transmission of the other data to the third device on the other communication medium. On the other hand, if there is no interference detected, the first device continues the transmission of the data stream to the second device without turning off other transmission(s) of other data to the third device (and/or to other devices) on other communication medium(s). In this manner, the first device may select the best or most reliable communication medium and mitigate interference during transmission of data.

BRIEF DESCRIPTION OF THE DRAWINGS

The present embodiments are illustrated by way of example and are not intended to be limited by the figures of the accompanying drawings, where.

DETAILED DESCRIPTION

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scopes all embodiments defined by the appended claims.

Figure 1:
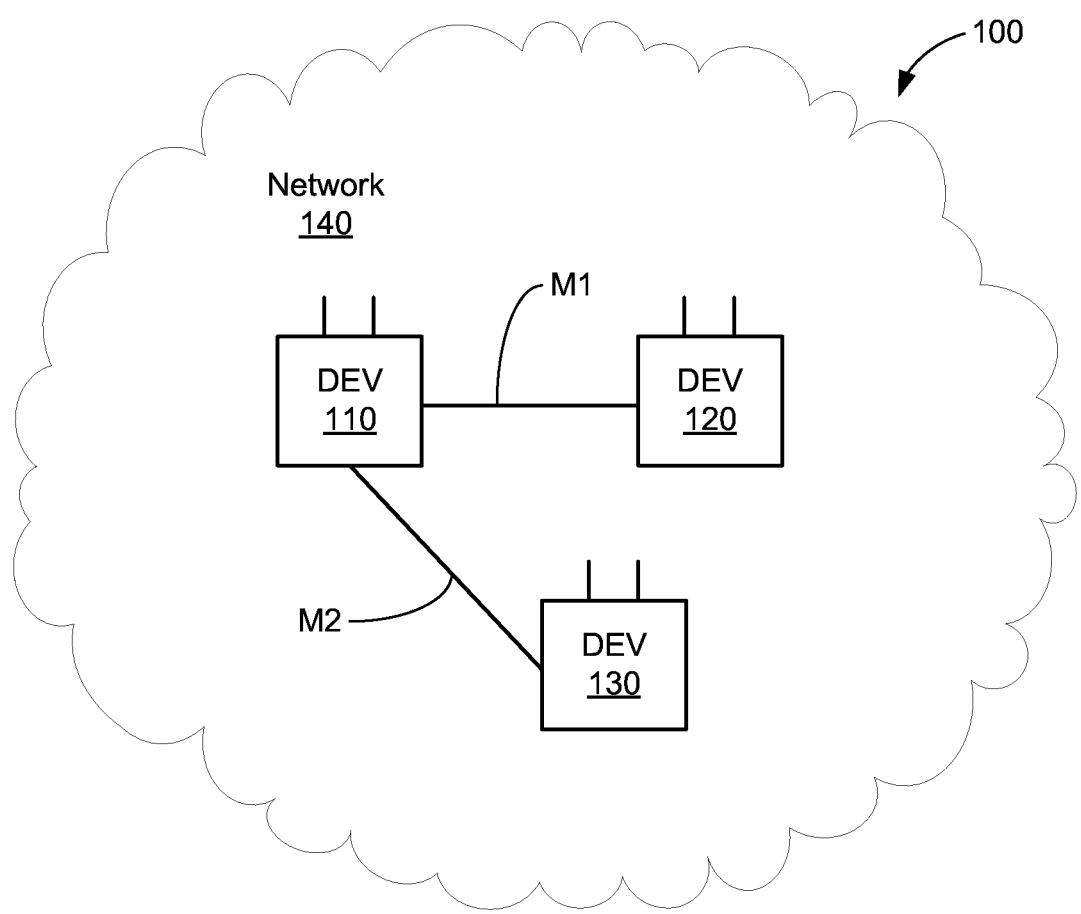
FIG. 1 is a block diagram of a networking system within which the present embodiments may be implemented.

FIG. 1 is a block diagram of a networking system 100 in accordance with the present embodiments. In one embodiment, the system 100 may include a plurality of devices, such as a first device 110, a second device 120, and a third device 130, within a network 140. Although only three devices 110-130 are shown in the example of FIG. 1, the system 100 may include additional devices that are capable of communicating with each other and with the devices 110-130 within the network 140. For some embodiments, the first device 110, the second device 120, and the third device 130 may be, for example, any network-enabled device, such as a computer, a laptop, a smart phone or cell phone, a personal digital assistant (PDA), table device, switch, router, hub, gateway, or the like. The first device 110, the second device 120, and the third device 130 may each include a transmitter/receiver (e.g., a transceiver) circuit, one or more processing resources, one or more memory resources, and a power source (e.g., battery). The memory resources may include a non-transitory computer-readable medium (e.g., one or more nonvolatile memory elements, such as EPROM, EEPROM, Flash memory, a hard drive, etc.) that stores instructions for performing operations described below with respect to FIG. 3.

Devices within the system 100 may communicate with each other over one or more different communication mediums. For example, the communication mediums may include a wireless medium (such as provided by Wi-Fi), an Ethernet transmission line, a co-axial cable, and a power line. In the example illustrated in FIG. 1, the first device 110 communicates with the second device 120 using a first communication medium M1 and also communicates with the third device 130 using a second communication medium M2. The first device 110 may also communicate with other devices (not shown) and/or the Internet to enable devices of the network 140 to also connect to the Internet (e.g., such as the second device 120 and the third device 130).

According to some embodiments, the first device 110 may include a mechanism (i) to select a communication medium from a plurality of communication mediums for transmitting a data stream to a device (such as the second device 120), (ii) to determine whether interference exists as a result of the transmission of other data via another communication medium to another device (such as the third device 130), and (iii) to turn off the transmission of the other data to the other device when interference exists. For example, the first device 110, the second device 120, and/or the third device 130 may each support various network technologies (e.g., Wi-Fi, PLC, MoCA, Ethernet, DOCSIS, and EPoC) that use different communication mediums (e.g., a wireless medium, an Ethernet transmission line, a co-axial cable, a power line, etc.). The first device 110 may determine that a data stream is to be transmitted to the second device 120 (e.g., the first device 110 receives a data stream from another device or the Internet for transmission to the second device 120), and may use the mechanism to determine which communication medium to use to transmit the data stream to the second device 120. The mechanism may allow the first device 110 to select the best or most reliable communication medium to transmit the data stream to the second device 120 (using a corresponding network technology). The first device 110 may make the determination based on a variety of different factors, as described below, and transmit the data stream to the second device 120 using the selected communication medium (such as the communication medium M1).

During the transmission of the data stream from the first device 110 to the second device 120, the first device 110 may determine whether the transmission of the data stream using the selected communication medium M1 is being interfered with by transmission of other data to another device on another communication medium. For example, the first device 110 may be transmitting other data to the third device 130 using the second communication medium M2 prior to determining that a data stream is to be transmitted to the second device 120 and/or prior to transmitting the data stream to the second device 120. If interference is detected, the first device 110 may turn off the transmission of the other data to the third device 130 using the second communication medium M2. In one example, the first device 110 may instead select and use another communication medium that does not interfere with the transmission of the data stream to the second device 120 to continue the transmission of the other data to the third device 130 (e.g., a third communication medium M3). As a result, the mechanism may allow the first device 110 to accommodate different networking technologies without impacting the performance of data transmission.

While the example described with respect to FIG. 1 illustrates the first device 110 using the mechanism to select a communication medium for transmitting a data stream and to mitigate interference, the second device 120 and/or the third device 130 may also include the described mechanism.

Figure 2:
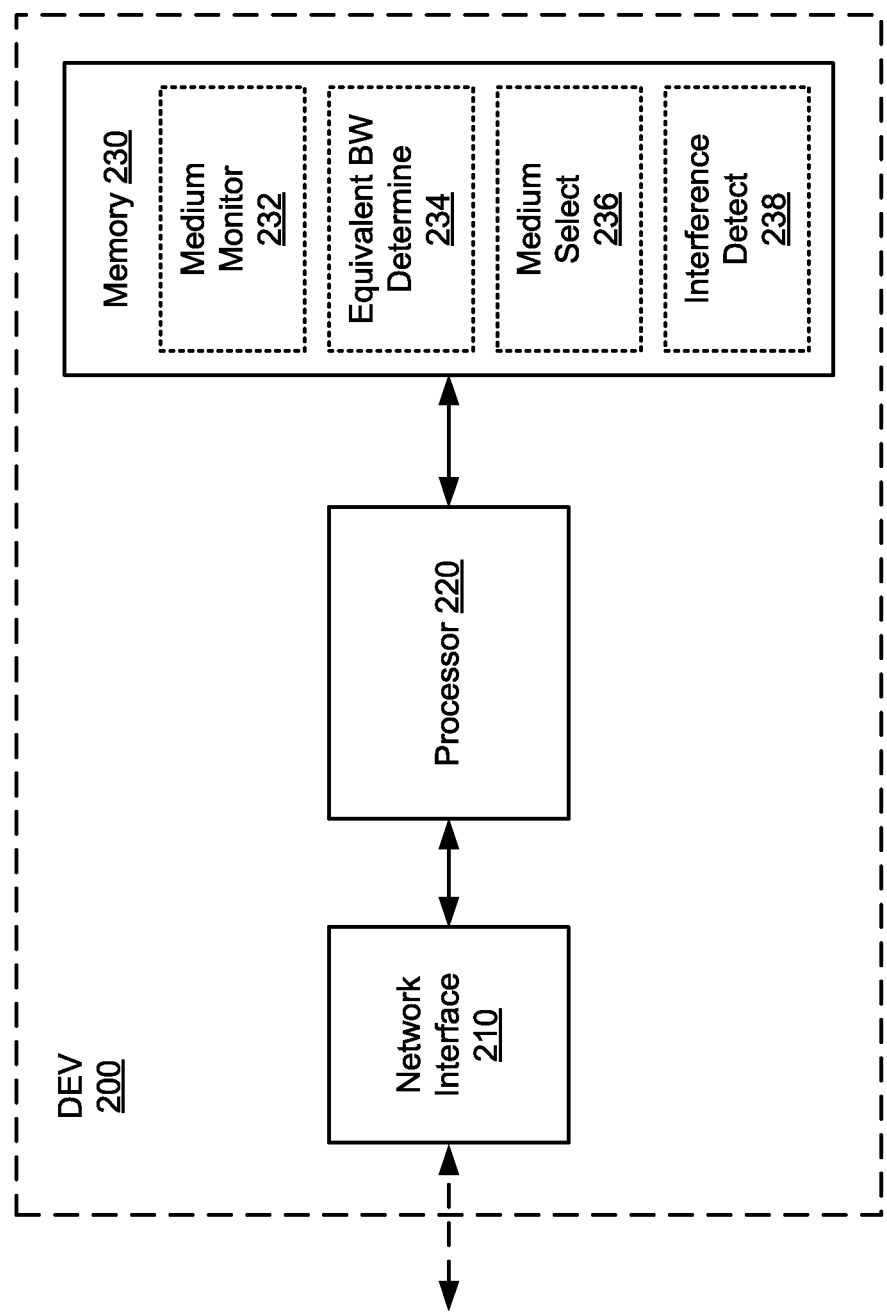
FIG. 2 is a block diagram of a computing device in accordance with some embodiments.

FIG. 2 is a block diagram of a network-enabled device in accordance with some embodiments. For example, the device 200 may correspond to the first device 110, the second device 120, and/or the third device 130 in the system 100 of FIG. 1. In one embodiment, the device 200 may include a network interface 210, a processor 220, and a memory 230. The network interface 210 is used to communicate with other devices in a network and/or the Internet either directly or via one or more intervening networks. In one example, the network interface 210 may communicate with another device using any one of the IEEE 1905.1 networking technologies—Wi-Fi, Ethernet, PLC, and MoCA—as well as DOCSIS and EPoC. The processor 220, which is coupled to the network interface 210 and the memory 230, may be any suitable processor capable of executing scripts or instructions of one or more software programs stored in the device 200 (e.g., within the memory 230).

Figure 3:
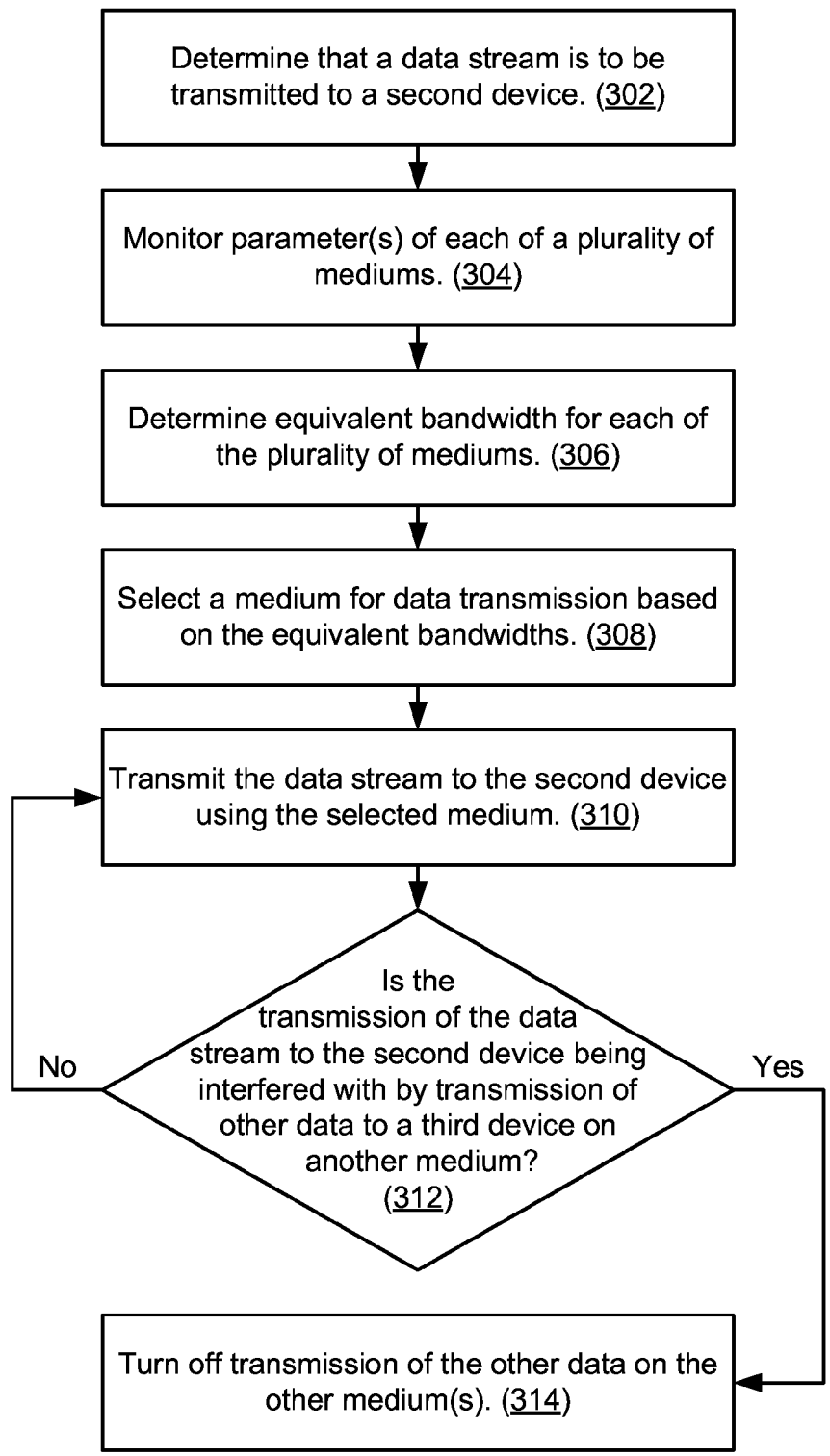
FIG. 3 is an illustrative flow chart depicting a data transmission operation in accordance with some embodiments.

Memory 230 includes a non-transitory computer-readable medium (e.g., one or more nonvolatile memory elements, such as EPROM, EEPROM, Flash memory, a hard drive, and so on) that stores the following software modules:

- a medium monitor module 232 to monitor one or more parameters for each of a plurality of communication mediums that may be used by the device 200 to transmit data to another device (e.g., as described for operation 304 of FIG. 3);
- an equivalent bandwidth determine module 234 to determine the equivalent bandwidth for each of the plurality of communication mediums based on the one or more monitored parameters (e.g., as described for operation 306 of FIG. 3);
- a medium select module 236 to select one of the plurality of communication mediums for transmitting data to another device based on the determined equivalent bandwidths (e.g., as described for operation 308 of FIG. 3);
- an interference detect module 238 to determine whether data transmission to one device using the selected communication medium is being interfered with by transmission of other data on another communication medium to another device, and to turn off the transmission of data to the other device using the other communication medium when interference is detected (e.g., as described for operation 312 and 314 of FIG. 3).

Each software module includes instructions that, when executed by processor 220, cause the device 200 to perform the corresponding functions. Additional modules (not shown) may also be stored within the memory 230. The non-transitory computer-readable medium of memory 230 thus includes instructions for performing all or a portion of the operations of method 300 of FIG. 3.

As described, the processor 220, which is coupled to the network interface 210 and the memory 230, may be any suitable processor capable of executing scripts or instructions of one or more software programs stored in the device 200 (e.g., within memory 230). For example, the processor 220 may execute medium monitor module 232, equivalent bandwidth determine module 234, medium select module 236, and/or interference detect module 238.

FIG. 3 is an illustrative flow chart depicting a method 300 for performing a data transmission operation in accordance with the present embodiments. As described above, the present embodiments allow a network-enabled device, such as the first device 110 of FIG. 1 or the device 200 of FIG. 2, to transmit data to a second device 120 while supporting a plurality of different networking technologies. Referring also to FIGS. 1 and 2, the first device 110 may determine that a data stream is to be transmitted to another device, such as the second device 120 (302). In one example, the first device 110 may receive a data stream from another source or device (e.g., via the Internet) that is to be transmitted to the second device 120.

For example, the first device 110 may correspond to a router or switch of a user's home network, while the second device 120 may correspond to a network-enabled television. The first device 110 and the second device 120 may communicate with each other within the network 140 (e.g., the user's home network) over a plurality of communication mediums (e.g., a wireless medium, an Ethernet transmission line, a co-axial cable, a power line) using corresponding networking technologies (e.g., Wi-Fi, Ethernet, PLC, MoCA, DOCSIS, EPoC). The first device 110 may receive a data stream, such as data for content that is to be displayed on the user's television (e.g., received from an online content source over the Internet).

The first device 110 may monitor (e.g., periodically) one or more parameters of each of the plurality of communication mediums in which it may transmit the data stream to the second device 120 (304). According to variations, the first device 110 may monitor the one or more parameters before, during, and/or after it determines that a data stream is to be transmitted to the second device 120. The parameters of the communication mediums may include (i) the data rate of the medium, which corresponds to the rate at which data may be transmitted to a particular destination or node, (ii) the error rate of the medium, which corresponds to the amount of noise and/or interference on the communication medium (e.g., indicative of the quality of the communication medium), and (iii) the medium utilization information, which measures how busy the medium is. The first device 110 may also monitor other parameters of the communication mediums, such as parameters related to quality of service or power consumption.

In response to determining that a data stream is to be transmitted to another device, the first device 110 may determine the equivalent bandwidths for each of the plurality of communication mediums (306). The equivalent bandwidth for a particular communication medium may be determined based on the data rate, the error rate, and/or the utilization information for that communication medium. For example, equivalent bandwidth, EB, may be expressed as follows:

$$EB = r(1-e)(1-m) \quad \text{(Eq. 1)}.$$

where "r" corresponds to the data rate, "e" corresponds to the error rate, and "m" corresponds to the medium utilization information for that communication medium.

In some cases, the error rate for one or more communication mediums may spike at an instance in time. To accommodate for outlier error rates, the error rate for a communication medium may be monitored by sampling a set of error rates at different instances in time and averaging the sampled set of error rates. The averaged error rate may be a better measurement for the quality or amount of noise on the communication medium than a monitored error rate having a spike at one instance in time. In some embodiments, the error rates may be monitored by transmitting training packets to other devices or nodes.

The first device 110 may select one of the communication mediums to transmit the data stream to the second device 120 based on the determined equivalent bandwidths of each of the communication mediums (308). According to at least one embodiment, the first device 110 may compare the determined equivalent bandwidths of each of the communication mediums and select the communication medium with the highest equivalent bandwidth to transmit the data stream. The first device 110 may also select a communication medium by determining whether one or more of the communication mediums has an error rate that is equal to or greater than a threshold error rate, and removing such communication mediums from selection. In this manner, even if the equivalent bandwidth for such communication medium(s) is greater than other communication mediums, the first device 110 may not select that communication medium for transmitting the data (e.g., as a result of the high error rate). For these embodiments, only those communications that have an error rate lower than the threshold error rate may be considered for selection.

In some embodiments, the first device 110 may similarly use a threshold data rate to determine whether one or more communication mediums has a date rate that is lower than a threshold data rate, and removing such communication mediums from selection.

As an addition or an alternative, the first device 110 may also determine the equivalent bandwidth of each of the networking technologies that use corresponding communication mediums, and determine which networking technology to use with the selected communication medium. For example, if the first device 110 determines that co-axial cable is the best communication medium to transmit data to the second device 120, the first device 110 may also determine which of the technologies that use co-axial cable is best suited for the data transmission (e.g., select between MoCA, EPoC, or DOCSIS).

The first device 110 transmits the data stream to the second device 120 using the selected communication medium (310). According to some embodiments, once the first device 110 begins to transmit the data using the selected communication medium, the error rates for the selected communication medium and/or other communication mediums may change (e.g., increase or decrease). As a result, the first device 110 may continue to monitor the parameters of the communication mediums after the data transmission begins and/or calculate the equivalent bandwidths of the communication mediums (and/or the equivalent bandwidths of the networking technologies). If the quality of the selected communication medium worsens during the transmission of data, the first device 110 may then dynamically switch from the selected communication medium to another communication medium having a better equivalent bandwidth.

Still further, in some embodiments, the first device 110 may dynamically switch mediums at predefined times (e.g., determine the equivalent bandwidths at certain times during the transmission of data and, if necessary, make a new selection). The first device 110 may also dynamically switch mediums based on the data being transmitted (e.g., media stream) so that a data transmission session may first be completed before the medium switching occurs. In another embodiment, the first device 110 may dynamically switch mediums based on the underlying network technology being used to transmit data. The first device 110 may monitor the communication medium (e.g., the error rate, the data rate) and/or determine the equivalent bandwidth for the communication medium at specified intervals of time. For example, if the data is being transmitted by the first device 110 to the second device 120 using PLC, the first device 110 may monitor the communication medium and/or determine the equivalent bandwidth for the communication medium every 33.3 ms, whereas if the data is being transmitted using MoCA, the first device 110 may monitor the communication medium and/or determine the equivalent bandwidth for the communication medium every 50 ms (e.g., under the assumption that MoCA is typically more stable than PLC).

As described, the frequency range of operation of a communication medium may interfere or overlap with another frequency range of operation of another communication medium. When the first device 110 transmits the data stream to the second device 120 using the selected communication medium, the first device 110 may determine whether the transmission of the data stream to the second device 120 using the selected communication medium is being interfered with by the transmission of other data to another device (e.g., the third device 130 of FIG. 1) on another communication medium (312).

For example, the first device 110 may have been transmitting other data to the third device 130 using another communication medium prior to determining that a data stream is to be transmitted to the second device 120 (at 302) and/or prior to transmitting the data stream to the second device 120 (at 310). If interference is detected, the first device 110 may cause the transmission of the other data to the third device 130 using the other communication medium to be turned off (e.g., turn off the transmitter of the interfering transmission of data) (314). In another example, the first device 110 may cause the other data that is transmitted to the third device 130 using the interfering communication medium to be transmitted instead on yet another communication medium that does not interfere with the transmission of the data stream to the second device 120 using the selected communication medium. If no interference is detected, as tested at 312, the first device 110 may continue to transmit the data stream to the second device 120 using the selected communication medium and continue to transmit the other data to the third device 130 using the other communication medium (that does not interfere with the transmission of data on the selected communication medium).

In this manner, the first device 110 may select the most reliable or stable communication medium in which to transmit data to a second device 120, select a different communication medium if another communication medium is determined to be more reliable, and/or turn off interfering data transmission to a third device 130 using another communication medium.

Referring back to FIG. 1, according to some embodiments, the first device 110 may share information about the communication mediums with other devices in the network 140 (e.g., with the second device 120, the third device 130, and other devices not shown). Such information may include the monitored parameters of the communication mediums, the determined equivalent bandwidths of the communication mediums, information about the interference(s) detected during transmission of data on a selected communication medium and associated protocol, instructions to turn off data transmission using a particular communication medium, etc. For example, the first device 110 may transmit a data stream to one or more devices within the network using a power line (via PLC protocol) and may determine that another data transmission using co-axial cable (via DOCSIS protocol) is interfering with the transmission of the data stream on the power line. The first device 110 may share this information to other devices within the network 140 to allow the other devices to coordinate with the first device 110 by also turning off data transmission using co-axial cable.

In one embodiment, the first device 110 may share the described information with other devices by broadcasting the information (e.g., to not use a particular communication medium for data transmission for a period of time) to the other devices within the network 140. For example, IEEE 1905.1 includes a mechanism that enables information to be shared between nodes or devices. The first device 110 may use this mechanism to broadcast the information pertaining to the communication mediums. In another example, the first device 110 may transmit a control packet to the other devices (e.g., to inform the other devices to turn off or to not use a particular communication medium for a period of time) using respective communication mediums that the other devices are capable of supporting and/or using the most stable or most reliable communication medium. In cases where the communication mediums for a device in the network 140 are unstable or unreliable, the first device 110 may transmit the control packet to the device using multiple communication mediums (e.g., using both wireless and Ethernet transmission line).

In the foregoing specification, the present embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense. For example, method depicted in the flow chart of FIG. 3 may be performed in other suitable orders and/or one or more methods steps may be omitted.

What is claimed is:

1. A method for transmitting data from a first device to a second device within a wired communication system, the method being performed by the first device and comprising:
    determining that a data stream is to be transmitted to the second device;
    selecting one of a plurality of communication mediums for transmitting the data stream to the second device;
    transmitting the data stream to the second device using the selected communication medium;
    determining that the transmission of the data stream to the second device using the selected communication medium is being interfered with by transmission of other data from the first device to a third device on another of the plurality of communication mediums; and
    in response to determining that the transmission of the data stream to the second device on the selected communication medium is being interfered with by the transmission of the other data to the third device using the other communication medium, turning off the transmission of the other data to the third device on the other communication medium.

2. The method of claim 1, wherein the third device and the second device are the same device.

3. The method of claim 1, wherein selecting one of the plurality of communication mediums comprises:
    determining, for each of the plurality of communication mediums, an equivalent bandwidth based on a utilization information of the corresponding communication medium, an error rate of the corresponding communication medium, and a data rate of the corresponding communication medium.

4. The method of claim 3, wherein selecting one of the plurality of communication mediums further comprises:

comparing the determined equivalent bandwidths for each of the plurality of communication mediums; and selecting the communication medium having a highest equivalent bandwidth.

5. The method of claim 3, wherein selecting one of the plurality of communication mediums further comprises:

determining that one or more of the plurality of communication mediums has an error rate that is equal to or greater than a threshold rate; and selecting one of the communication mediums that has an error rate less than the threshold rate.

6. The method of claim 3, further comprising:

periodically monitoring at least one of the utilization information, the error rates, or the data rates of each of the plurality of communication mediums.

7. The method of claim 6, wherein monitoring the error rates of each of the plurality of communication mediums comprises:

sampling a set of error rates of each of the plurality of communication mediums at different instances in time; and averaging the sampled set of error rates.

8. The method of claim 1, wherein the plurality of communication mediums comprises an Ethernet transmission line, a co-axial cable, and a power line.

9. A communication device, comprising:

a network interface to transmit a data stream to a second device using a selected one of a plurality of communication mediums;

a processor coupled to the network interface; and a memory storing instructions that, when executed by the processor, cause the communication device to:

determine that the data stream is to be transmitted to the second device;

select one of the plurality of communication mediums to be used by the network interface to transmit the data stream to the second device;

determine that the transmission of the data stream to the second device using the selected communication medium is being interfered with by transmission of other data from the communication device to a third device on another of the plurality of communication mediums; and in response to determining that the transmission of the data stream to the second device on the selected communication medium is being interfered with by the transmission of the other data to the third device using the other communication medium, turn off the transmission of the other data to the third device on the other communication medium.

10. The communication device of claim 9, wherein the third device and the second device are the same device.

11. The communication device of claim 9, wherein execution of the instructions by the processor causes the communication device to selects the one of the plurality of communication mediums by determining, for each of the plurality of communication mediums, an equivalent bandwidth based on a utilization information of the corresponding communication medium, an error rate of the corresponding communication medium, and a data rate of the corresponding communication medium.

12. The communication device of claim 11, wherein execution of the instructions by the processor causes the communication device to selects the one of the plurality of communication mediums by (i) comparing the determined equivalent bandwidths for each of the plurality of communication mediums, and (ii) selecting the communication medium having a highest equivalent bandwidth.

13. The communication device of claim 11, wherein execution of the instructions by the processor causes the communication device to selects the one of the plurality of communication mediums by (i) determining that one or more of the plurality of communication mediums has an error rate that is equal to or greater than a threshold rate, and (ii) selecting one of the communication mediums that has an error rate less than the threshold rate.

14. The communication device of claim 11, wherein execution of the instructions by the processor causes the communication device to periodically monitors at least one of the utilization information, the error rates, or the data rates of each of the plurality of communication mediums.

15. The communication device of claim 14, wherein execution of the instructions by the processor causes the communication device to monitors the error rates of each of the plurality of communication mediums by (i) sampling a set of error rates of each of the plurality of communication mediums at different instances in time, and (ii) averaging the sampled set of error rates.

16. The communication device of claim 9, wherein the plurality of communication mediums comprises an Ethernet transmission line, a co-axial cable, and a power line.

17. A non-transitory computer-readable medium storing program instructions that, when executed by a communication device, cause the communication device to perform operations comprising:

determine that a data stream is to be transmitted to a second device;

select one of a plurality of communication mediums for transmitting the data stream to the second device;

transmit the data stream to the second device using the selected communication medium;

determine whether the transmission of the data stream to the second device using the selected communication medium is being interfered with by transmission of other data from the communication device to a third device on another of the plurality of communication mediums; and turn off the transmission of the other data to the third device on the other communication medium if transmission of the data stream to the second device on the selected communication medium is being interfered with by the transmission of the other data to the third device using the other communication medium.

18. The non-transitory computer-readable medium of claim 17, wherein the third device and the second device are the same device.

19. The non-transitory computer-readable medium of claim 17, wherein execution of the program instructions causes the communication device to select one of the plurality of communication mediums by determining, for each of the plurality of communication mediums, an equivalent bandwidth based on a utilization information of the corresponding communication medium, an error rate of the corresponding communication medium, and a data rate of the corresponding communication medium.

20. The non-transitory computer-readable medium of claim 19, wherein execution of the program instructions causes the communication device to select one of the plurality of communication mediums by (i) comparing the determined equivalent bandwidths for each of the plurality of communication mediums, and (ii) selecting the communication medium having a highest equivalent bandwidth.

21. The non-transitory computer-readable medium of claim 19, wherein execution of the program instructions causes the communication device to select one of the plurality of communication mediums by (i) determining that one or more of the plurality of communication mediums has an error rate that is equal to or greater than a threshold rate, and (ii) selecting one of the communication mediums that has an error rate less than the threshold rate.

22. The non-transitory computer-readable medium of claim 19, wherein execution of the program instructions causes the communication device to periodically monitor at least one of the utilization information, the error rates, or the data rates of each of the plurality of communication mediums.

23. The non-transitory computer-readable medium of claim 22, wherein execution of the program instructions causes the communication device to monitor the error rates of each of the plurality of communication mediums by (i) sampling a set of error rates of each of the plurality of communication mediums at different instances in time, and (ii) averaging the sampled set of error rates.

24. The non-transitory computer-readable medium of claim 17, wherein the plurality of communication mediums comprises an Ethernet transmission line, a co-axial cable, and a power line.

* * * * *